United States Patent [19]

Saari

[11] Patent Number: 4,964,749
[45] Date of Patent: Oct. 23, 1990

[54] JOINT PIECE
[75] Inventor: Tapio Saari, Tampere, Finland
[73] Assignee: Rauma Repola OY, Finland
[21] Appl. No.: 341,934
[22] Filed: Apr. 21, 1989
[30] Foreign Application Priority Data Apr. 29, 1988 [FI] Finland .................................. 882027

[51] Int. Cl.⁵ .............................................. F16D 1/00
[52] U.S. Cl. ..................................... 403/169; 403/271; 403/205
[58] Field of Search ............... 403/205, 271, 272, 170, 403/174, 169

[56] References Cited

U.S. PATENT DOCUMENTS 2,654,619  10/1953  Gaum .
3,596,950  8/1971   Wipkink .
4,092,077  5/1978   George .
4,101,230  7/1978   Moe .................................. 403/272 X
4,425,048  1/1984   Kamohara et al. ............. 403/272 X

FOREIGN PATENT DOCUMENTS 650785   10/1937  Fed. Rep. of Germany .
869452   3/1953   Fed. Rep. of Germany .
8603723  12/1985  PCT Int'l Appl. .
733847   7/1955   United Kingdom .
1517233  7/1978   United Kingdom .
1546868  5/1979   United Kingdom .
1602429  11/1981  United Kingdom .
2122711  1/1984   United Kingdom .

Primary Examiner—Andrew V. Kundrat
Attorney, Agent, or Firm—Pravel, Gambrell, Hewitt, Kimball & Krieger

[57] ABSTRACT

The invention concerns a joint piece cast out of steel for tubes of trusswork constructions, said joint piece comprising a frame tube and at least one branch. The end of the branch (5) is shaped so that, when it is cut at different angles, it can constitute a connecting head for the joining of a tube at different angles.

7 Claims, 2 Drawing Sheets

JOINT PIECE

BACKGROUND OF INVENTION

1. Field of Invention

The invention concerns cast tube-joint pieces used in trusswork constructions constructed out of steel tubes. Such constructions are used, e.g., in oil drill towers and in the support legs of offshore oil drill rigs.

2. Description of Prior Art

At the branching points in large trusswork constructions made of steel tubes particular cast joint pieces are frequently used. In these joint pieces there is a branch for each tube to be joined. Each tube to be joined is welded to the end of its associated branch endwise. By use of cast joint pieces, considerable advantages are obtained as compared with the use of welded joints alone:

The welding work is easier, because the joints are aligned end to end. The tube ends to be joined may also be machined ready in advance.

The welding joints are located in areas in which they are not subjected to high strains.

By casting, the angle points can be rounded gradually, which is necessary to eliminate risky tension peaks.

By means of the casting technique, the critical joint areas can be made stronger at the exact location where strength is needed.

In rectangular constructions, it is possible to use identical joint pieces for the various branching points. However, in the case of conical tower constructions, the joint angles of the tubes vary based on the type of branching points. Thus for one such conical tower construction, it is necessary to cast a great number of different types of joint pieces, which of course makes the unit costs of the different joint pieces quite high.

SUMMARY OF INVENTION

Thus, the general object of the present invention is to provide an arrangement by means of which it is possible to lower the costs arising from the joint pieces in tube constructions of the sort described above when the joint angles of the tubes vary from joint piece to joint piece.

The object of the invention is achieved by the means disclosed in the patent claims.

It is an essential feature of the invention that the end of a branch for a joint piece is shaped so that it can be cut at different angles. In this manner the branch can be adapted for service as a connecting head for joining of tubes at one of several different angles.

DESCRIPTION OF PREFERRED EMBODIMENT

Figure 1:
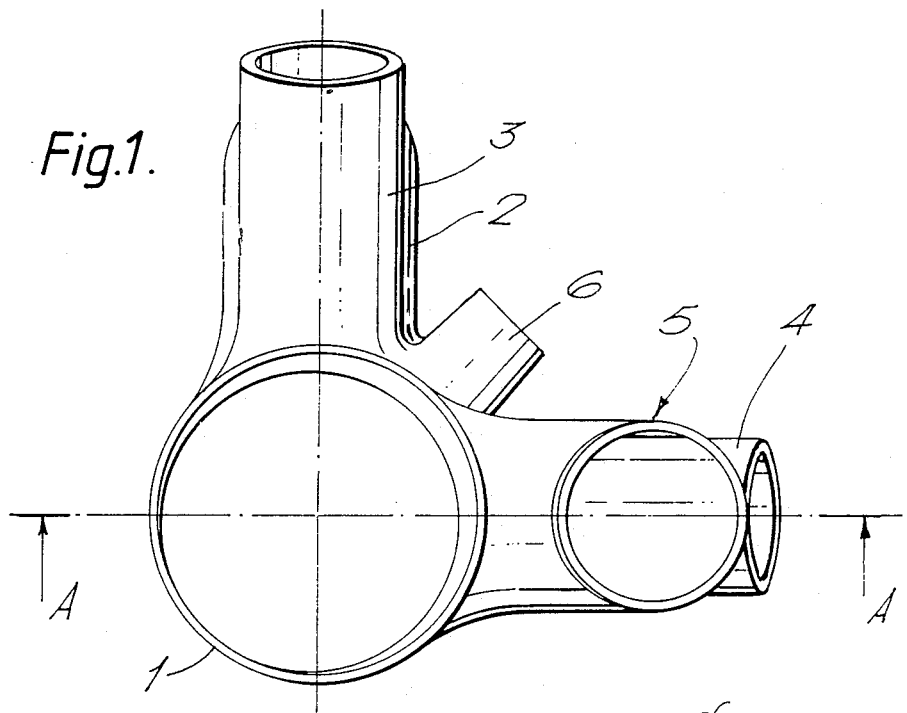
FIG. 1 is a top view of a joint piece.
Figure 2:
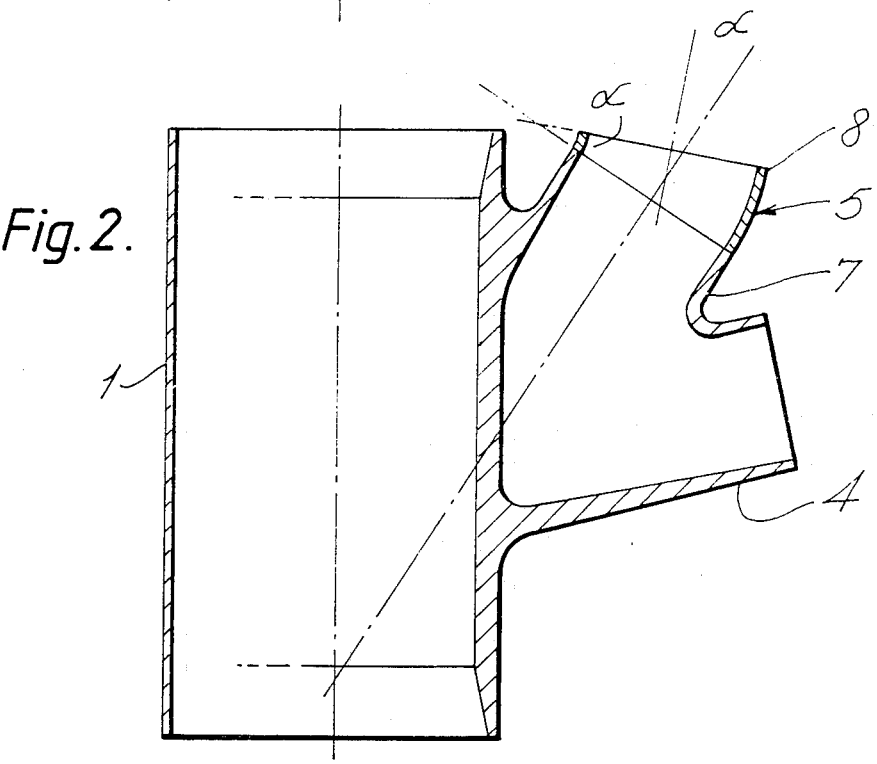
FIG. 2 is a side view of the same piece in cross section along the line A—A of FIG. 1.

The joint piece shown in FIGS. 1 and 2 is intended as an angle joint piece for a conical tower of square horizontal cross-section. The joint piece comprises a frame tube 1, which is joined by five branches: the branches 2 and 3 placed one above the other, the branches 4 and 5 placed one above the other, as well as the branch 6 between said pairs of branches. The thickness of the frame tube 1 is, for example, 1400 mm and the height 2500 mm.

The construction of the branches 4 and 5 can best be seen in FIG. 2. The lower branch 4 is horizontal in the construction. A tube of 600 mm diameter is to be connected to it. The branch 5 is an angle branch, to which a tube of 762 mm is to be connected. To the ends of the branches, welding chamferings are machined in accordance with the wall thicknesses of the tubes. The bottoms of the branches 4 and 5 on the frame tube 1 overlap each other partly. In this way it has been possible to make the length of the frame tube 1 shorter. The effect of the cavity between the branches on the strength must, of course, be taken into account in the dimensioning.

The joints between the branches 2, 3, 4, 5 and 6 and the frame tube 1 are rounded so that no dangerous tension concentrations are produced in a loaded construction. By using an optimal technique with a view towards successful casting, a construction is obtained wherein the wall thickness of the branches 2, 3, 4, 5 and 6 is increased when moving from the end of them towards the base of them and wherein the wall of the frame tube 1 is at its juncture with the branches 2, 3, 4, 5 and 6 thicker than elsewhere. In this way, the curvature of the juncture can be made sound in nature, and the construction becomes strong exactly where needed, at the critical points.

The frame 7 of the branch 5 is a cylindrical tube, but its end 8 has been curved upwards by an angle $\alpha$. Thus, to the end 8 of the branch 5, a tube can be joined by means of a butt joint at an angle $\alpha$ upwards relative to the frame 7 of the branch 5. The end 8 may also be cut off at an appropriate point, in which case a tube can be joined to the end at any desired angle of from 0 through $\alpha$ degrees. The curve radius of the end 8 is chosen so that no dangerous tensions concentrations are formed in a loaded construction.

Figure 3:
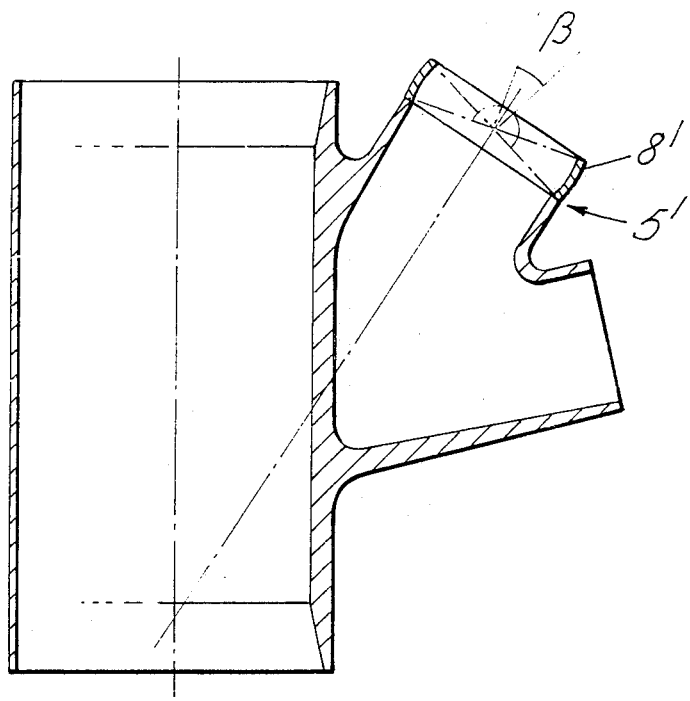
FIG. 3 shows an alternative construction of a joint piece illustrated in cross-section as in FIG. 2.

In the joint piece shown in FIG. 3, an end 8' of a branch 5' has the shape of an equatorial segment of a sphere defined by an arc of $\beta$ degrees. Such an equatorial segment is a horizontal segment of a sphere adjacent the equator, the circle or line dividing the sphere into two equal and symmetrical segments. The inner diameter of the sphere equatorial segment at its ends is equal to the diameter of the tube. By cutting the equatorial segment appropriately at a desired angle, it is possible to join a tube endwise to the end 8' at any desired angle of from 0 through $\beta/2$ degrees.

The end of a branch may also be shaped as a calotte. By cutting the calotte in a suitable way, tubes of different diameters can be connected to the branch. To the cut-off end, it is also possible to machine a welding chamfering in a suitable way.

Figure 4:
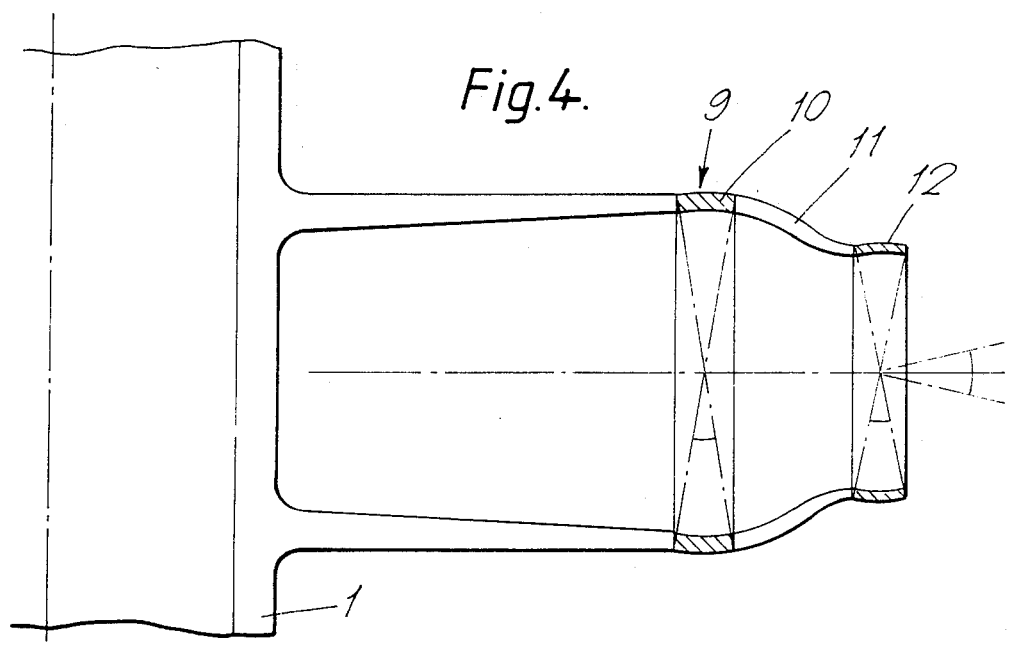
FIG. 4 shows a detail of another joint piece as a side view and in cross-section.

In a joint piece in accordance with FIG. 4, a branch 9 is connected to the frame tube 1 at a right angle. At the end of said branch 9 there is an equatorial segment-shaped connecting head 10 corresponding to the diameter of the root, a narrowing portion 11, as well as an equatorial segment-shaped joint portion 12 of small diameter. In this way, tubes of two different diameters can be connected to the branch 9.

In the dimensioning of the joint pieces, it is, of course, necessary to take into account the additional strain arising from a variable angular joint.

The material of the joint piece is preferably cold-weldable steel. For offshore constructions, the vacuum-melt steel sold under the trademark Vaculock ® is especially suitable.

In principle, the above arrangements can also be applied to the joining of tubes of oval section.

What is claimed is:

1. A joint piece cast out of steel, comprising a frame tube and at least one branch on an outer face of said frame tube, said branch having a straight tubular frame portion and a tube portion connected to an end of said straight tubular frame portion opposite said frame tube, said tube portion curving from said straight tubular portion, said tube portion when cut at a desired angle forming an aligned connecting head for joining to a tube at the desired angle.

2. A joint piece as claimed in claim 1, characterized in that the diameter of said tube portion of said branch corresponds to the diameter of said tubular frame portion of said branch.

3. A joint piece as claimed in claim 1, characterized in that said tube portion of said branch comprises a tube portion bending at an angle $\alpha$ from said straight tubular portion, said tube portion when cut at a desired angle of from 0° to $\alpha$ degrees forming said aligned connecting head.

4. A joint piece as claimed in claim 1, characterized in that the diameter of said tube portion of said branch is smaller than the diameter of said tubular frame portion of said branch.

5. A joint piece as claimed in claim 4, characterized in that said tube portion of said branch comprises an intermediate connecting part whose diameter corresponds to the diameter of said tubular frame portion of said branch and which is connected to said tubular frame portion by means of a narrowing portion.

6. A joint piece as claimed in claim 1, characterized in that the end of the branch is calotte-shaped.

7. A joint piece as claimed in claim 1, characterized in that said tube portion of said branch comprises a tube portion curving spherically over a spherical segment of B degrees from said straight tubular portion, said tube portion when cut at a desired angle of from 0° to B/2 degrees forming said aligned connecting head.

* * * * *